United States Patent
Bader

(10) Patent No.: US 8,326,146 B2
(45) Date of Patent: Dec. 4, 2012

(54) COMMUNICATIONS NODE FOR AND METHOD OF ROUTING OPTICAL DATA PACKET SIGNALS

(75) Inventor: Atilla Bader, Paty (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 434 days.

(21) Appl. No.: 12/529,457

(22) PCT Filed: Mar. 15, 2007

(86) PCT No.: PCT/EP2007/052450
§ 371 (c)(1),
(2), (4) Date: Sep. 1, 2009

(87) PCT Pub. No.: WO2008/110214
PCT Pub. Date: Sep. 18, 2008

(65) Prior Publication Data
US 2010/0111526 A1    May 6, 2010

(51) Int. Cl.
*H04J 14/00* (2006.01)
*H04J 1/00* (2006.01)
*H04J 3/12* (2006.01)

(52) U.S. Cl. .......... 398/45; 398/43; 398/161; 398/158; 398/140; 370/486; 370/538; 370/314; 370/392

(58) Field of Classification Search .......... 398/161, 398/158, 140, 45, 43
See application file for complete search history.

(56) References Cited

U.S. PATENT DOCUMENTS

| 7,177,544 | B1 | 2/2007 | Wada et al. | |
|---|---|---|---|---|
| 2002/0024698 | A1* | 2/2002 | Jiang et al. | 359/127 |
| 2002/0146038 | A1* | 10/2002 | Casavant et al. | 370/486 |
| 2005/0163427 | A1 | 7/2005 | Ohta et al. | |
| 2006/0257144 | A1 | 11/2006 | Wai et al. | |

FOREIGN PATENT DOCUMENTS

| EP | 0 794 684 | 9/1997 |
|---|---|---|
| JP | 04-185139 | 7/1992 |
| JP | 4-185139 A | 7/1992 |

(Continued)

OTHER PUBLICATIONS

Kenichi Translation, Front page.*

(Continued)

*Primary Examiner* — Shi K Li
*Assistant Examiner* — Oommen Jacob
(74) *Attorney, Agent, or Firm* — Nixon & Vanderhye, P.C.

(57) ABSTRACT

The invention relates to a communications node (10) for routing an optical signal 5 comprising at least one data packet, the node (10) having an input optic fiber (12) and an output optic fiber (14) in communication with each other, the input optic fiber (12) in communication with an optical splitter (20) which is arranged to split an incoming optical signal into at least two substantially identical optical signals, the optical splitter (20) further arranged to pass one of the optical signals to an optical correlator (22) and the other of the optical signals to an input optical switch (24), the optical correlator (22) being arranged to compare an address of the packet with a reference address (40) and to generate a trigger if the reference address (40) matches the address of the packet, the input optical switch (24) being arranged to route the data packet to an optical to electrical converter (28) in response to the trigger. Such an arrangement allows individual optical data packets to be dropped from the node as required.

13 Claims, 5 Drawing Sheets

FOREIGN PATENT DOCUMENTS

| | | | |
|---|---|---|---|
| JP | 2002-319869 A | | 10/2002 |
| JP | 2002319896 A | * | 10/2002 |
| WO | 94/21088 | | 9/1994 |

OTHER PUBLICATIONS

International Search Report for PCT/EP2007/052450, mailed Mar. 28, 2008.

Prucnal et al, "Self-Routing Photonic Switching With Optically Processed Control", Optical Engineering, Soc. Of Photo-Optical Instrumentation Engineers. Bellingham, US, vol. 29, No. 3, Mar. 1, 1990, pp. 170-182, XP000113511.

Wang, B. C., et al., "A Novel Fast Optical Switch Based on Two Cascaded Terahertz Optical Asymmetric Demultiplexers (TOAD)," Optics Express, vol. 10, No. 1, Jan. 14, 2002.

Wada, N., et al., "Characterization of a Full Encoder/Decoder in the AWG Configuration for Code-Based Photonic Routers—Part II: Experiments and Applications," Journal of Lightwave Technology, vol. 24, No. 1, Jan. 2006, pp. 113-121.

\* cited by examiner

COMMUNICATIONS NODE FOR AND METHOD OF ROUTING OPTICAL DATA PACKET SIGNALS

This application is the U.S. national phase of International Application No. PCT/EP2007/052450, filed 15 Mar. 2007, which designated the U.S. the entire contents of which is hereby incorporated by reference.

The technology disclosed herein relates to a communications network and in particular, but not exclusively, to a node of a communications network, and methods and software for operation thereof.

Known communications networks operating using Wavelength Division Multiplexing (WDM) include nodes to add or drop individual wavelengths carrying data to or from the network. Such nodes may be arranged in a ring network in which nodes are connected by optical fibres in series to form a closed loop or ring. An optical cross connect within each node allows individual wavelengths carrying data to be routed on different line directions. The optical cross connect can also selectively terminate wavelengths as required.

Dense Wavelength Division Multiplexing (DWDM) has been used with high efficiency in high capacity transport networks, where many circuit connections are multiplexed into high capacity trunk connections. In this arrangement either permanent or temporary circuit connections are established as optical connections between nodes of the network to form a circuit switched network.

DWDM technology is less suitable for packet switched networks such as those using the Internet Protocol (IP). This is due to the maximum available link capacity which is in the order of 1-10 Gbit/channel, and the maximum available channels per fibre which is currently in the range 4-120. Such a link capacity is insufficient to carry a large number of connections at the same time, as may be required by a packet switched network. One advantage of a packet switched network compared to a circuit switched network is the possibility to statistically multiplex traffic for several users of the network without preliminary allocation of resources within the network. This leads to a more efficient use of the network.

It is known to convert all optical packets into the electrical domain using switching nodes using optical to electrical converters. Such converters are commercially available with up to 40 GHz switching capacity. Specialised motherboards having chips are also available for such converters but they are expensive, and using them in a large quantity, for example in mobile access networks where several thousand nodes require connection, is not economically viable. In known optical to electrical converters the optical signals (i.e. packets) are converted into electronic signals so that the routing and switching functions are performed electronically within a switching node. Electronic signals for onward transmission are converted back into optical signals at output ports of the switching nodes. In this way switching at the packet level is performed.

Such optical to electrical converters represent a bottleneck in the communication process because it is essentially a wasted step. The trend to increase switching capacity is set to continue and a current industry goal is to achieve a switching capacity of the THz order of magnitude.

In a packet switched network the route of a packet is determined by an address included in a header of the packet. The header usually contains the destination address, and the decoding and recognition of the header is performed by electronic circuits once the packet has been converted from the optical into the electrical domain. Effective packet switched networks require buffering of packets for efficient operation of the network. Currently buffers and schedulers are difficult to realise optically because of the limited processing capability of optical components. Furthermore optical random access memories to act as buffers do not exist, although delay-line type optical buffers are available.

The technology disclosed herein aims, in at least one of its embodiments, to solve or at least ameliorate the problems of the known arrangement by providing an architecture that permits a node with faster switching, and a cost effective realisation of a node having a higher data throughput. The technology disclosed herein aims to avoid the need, or at least reduce or limit the need, for converting from the optical to the electrical domain.

According to a first aspect of the technology disclosed herein, there is provided a communications node for routing an optical signal comprising at least one data packet from a first data flow, the node having an input optic link and an output optic link in communication with each other, the input optic link in communication with an optical splitter which is arranged to split an incoming optical signal into at least two substantially identical optical signals, the optical splitter further arranged to pass one of the optical signals to an optical correlator and the other of the optical signals to an input optical switch, the optical correlator being arranged to compare an address of the packet with a reference address and to generate a trigger if the reference address matches the address of the packet, the input optical switch being arranged to route the data packet to an optical to electrical converter in response to the trigger to drop the data packet from the node.

A node so arranged has the advantage that a packet header can be decoded and recognised whilst it is in the optical domain and permits individual optical data packets to be dropped from the node as required. The optical correlator allows very fast address decoding because the header is not required to be converted into the electrical domain. Such optical decoding is performed by the optical correlator which is able recognise the header of an optical packet. Using an optical correlator and an optical switch avoids the requirement for converting all data packets into the electrical domain. A higher data transmission rate is possible than by conversion of all optical data into the electrical domain where the transmission rate is limited by the detector and the processing speed of the electronics. A header typically has a lot less data content than the rest of the packet associated with it.

Such an arrangement has the advantage of providing a more cost effective realisation of a node whilst limiting the need to convert from the optical to the electrical domain. The node has particular application in a packet switched network where there are usually many more individual connections than in a circuit switched network, and where many individual connection share the same resources. It will be appreciate that data packets that are not addressed to the optical switch, will not be sent to the optical to electrical converter. It will be appreciated that this arrangement has the advantage that the optical to electrical converter is only required to handle a much lower bit rate than the optical transport network itself. This arrangement permits the data packets sent to the optical to electrical converter to be processed in a more complex (and slower) manner as necessary. The node has the advantage that several data flows can be transported by one wavelength (i.e. one channel). Furthermore because the data processing unit can be realised using electronic processors rather than optical devices the node is cheaper to implement.

Preferably an input delay line is provided between the optical splitter and the input switch. Such a delay line provides the advantage of allowing the optical correlator more time to perform the comparison between the reference address and the address of the packet.

Preferably the optical to electrical converter is in communication with a data processing unit to drop the data packet from the node, and preferably the data processing unit is arranged to process only data packets that are addressed to it. Such an arrangement has the advantage that the data processing unit does not waste time processing data packets that are not addressed to it.

The communications node preferably has an output optical switch with an input from a transmitter and the input optical switch, the output optical switch having an output to the output optical link, and the transmitter being used for adding a data packet to the node.

Preferably the transmitter is arranged to transmit an optical packet to the output optical switch in response to the trigger from the optical correlator. Preferably the output optical switch is arranged to switch an optical packet from the transmitter to the output link in response to the trigger from the optical correlator. This arrangement ensures that the optical packet is sent to the output optical link at the correct moment in time.

Preferably the output optical switch is arranged to switch a data packet to the output optical link responsive to the input optical switch switching a data packet to the optical to electrical converter. This ensures that a packet added to the node fills available space created in the optical link. Such a way of operating the node is very effective because traffic added to the node does not occupy additional space in the optical link, but merely fills available space in the optical link which has been created by the traffic dropped from the node. In effect the uplink uses time slots created by the downlink.

Preferably the node has a buffer upstream of the transmitter and adapted to receive a data packet added to the node.

The node may further comprise a control unit providing in use a control channel capable of providing the reference address to the optical correlator. Preferably the control unit is external to the node.

In one embodiment a dummy packet is added to the node and the payload thereof is filled with the payload of a data packet added to the node. Preferably the transmitter is arranged to request a dummy packet to be added to the node. In one embodiment the node further comprises a control node in communication with the input optic link, the control node being adapted to add a dummy packet to the node.

Preferably the dummy packet is addressed to the node but not addressed to the optical to electrical converter.

In one embodiment the control node is arranged to add a dummy packet to the node at a predetermined rate. In another embodiment the node further comprises a data monitoring device, and wherein the amount of data dropped from the node and the amount of data added to the node are monitored by the data monitoring device, and a dummy packet is arranged to be added to the node if the difference between the amount of data dropped from the node and the amount of data added to the node falls below a threshold. In yet another embodiment the node further comprises a data monitoring device, and wherein the amount of data dropped from the node and the amount of data added to the node are adapted to be monitored by the data monitoring device, and a dummy packet is arranged to be added to the node if the amount of data dropped from the node falls below a threshold.

The trigger may be generated in response to a dummy packet detected by the correlator.

In one embodiment the communications node further includes a delay switch having an input from the input switch, the delay switch having an output to the output switch and another output to an output delay line, the output delay line in communication with an input to the output switch, the delay switch arranged to accept data from the input switch and to send it to the output delay line or to the output switch under control of the transmitter. This arrangement permits data to be added to the node in real time, such as may be required, for example, in real time video streaming.

The communications node may further include arranging the transmitter to send data to the output switch in response to data from the input switch being sent to the output delay line. A control signal is sent to the delay switch by the transmitter to achieve this.

Preferably the delay switch is arranged to delay data from the input optical switch for one switching period.

The communications node may further include routing at least one data packet from a second data flow in the input optical link.

Preferably the input optical switch is either a monostable or a bistable device.

According to a second aspect of the technology disclosed herein there is provided a communications node for routing an optical signal comprising at least one data packet from a first data flow, the node having an input optic link and an output optic link in communication with each other, the input optic link in communication with an optical splitter which is arranged to split an incoming optical signal into at least two substantially identical optical signals, the optical splitter further arranged to pass one of the optical signals to an optical correlator and the other of the optical signals to an output optical switch, the optical correlator being arranged to generate a trigger in response to the data packet, the output optical switch being arranged to switch another data packet to the output optical link in response to the trigger to add data to the node.

Such an arrangement permits data to be added to the node under control of the correlator which controls when the data should be added to the node to provide an optimal way of using the available space in an uplink.

Preferably an input delay line is provided between the optical splitter and the output switch.

Preferably a transmitter is provided in communication with the output optical switch, the transmitter being adapted to add data to the node.

Preferably the node further comprises a buffer upstream of the transmitter, the node being configured in use to input data added to the node to the buffer prior to the data being input to the transmitter.

The transmitter may be arranged to transmit an optical packet to the output optical switch in response to the trigger from the optical correlator.

The communications node may further include an input optical switch between the optical splitter and the output optical switch, wherein the output optical switch is arranged to switch a data packet to the output optical link responsive to an input optical switch dropping data from the node.

A control unit may be provided and the output switch may be operable under the management of a control channel provided by a control unit. The control unit may be external to the node.

In one embodiment the communications node may be further arranged to add a dummy packet to the node and to fill a payload of the dummy packet with a payload of a data packet added to the node.

Preferably the transmitter is arranged to request a dummy packet to be added to the node.

In one embodiment the dummy packet is added to the node by a control node in communication with the input optic link.

In one embodiment the control node is arranged to add a dummy packet to the node at a predetermined rate. In another embodiment a data monitoring device is provided and adapted to monitor the amount of data dropped from the node and the amount of data added to the, the node being configured to such that dummy packet is added to the node if the difference between the amount of data dropped from the node and the amount of data added to the node falls below a threshold. In yet another embodiment a data monitoring device is provided and adapted to monitor the amount of data dropped from the node and the amount of data added to the node, the node being configured to add, in use, the dummy packet to the node if the amount of data dropped from the node falls below a threshold.

Preferably the trigger is generated in response to a dummy packet detected by the correlator.

In one embodiment the communications node further includes a delay switch having an input from the optical splitter, the delay switch having an output to the output switch and another output to an output delay line, the output delay line in communication with an input to the output switch, the delay switch arranged to accept data from the optical splitter and to send it to the output delay line or to the output switch under control of the transmitter.

The communications node may further include arranging the transmitter to send data to the output switch in response to data from the input switch being sent to the output delay line. Preferably the delay switch is arranged to delay data from the optical splitter for one switching period.

The communications node may be further adapted, in use, to route at least one data packet from a second data flow in the input optical link.

Preferably the output optical switch is either a monostable or a bistable device.

According to a third aspect of the technology disclosed herein there is provided a communications node for routing an optical signal comprising at least one data packet from a first data flow, the node having an input optic link and an output optic link in communication with each other, the input optic link in communication with a delay switch having an output to an output optical switch and another output to an output delay line, the output delay line in communication with an input to the output optical switch, the delay switch arranged to accept data from the input optical link and to send it to the output delay line or to the output switch under control of the transmitter, the transmitter arranged to send data to the output switch in response to the delay switch sending data to the output delay line to add data to the node.

A node so arranged permits data to be added to the node in real time, such as may be required in, for example, real time video streaming.

Preferably the node further comprises a buffer upstream of the transmitter, and arranged such that in use the data added to the node is input to a buffer prior to being input to the transmitter.

Preferably at least one of the transmitter, the delay switch and the output optical switch is operated under the management of a control channel provided by a control unit.

The control unit may be external to the node.

Preferably the delay switch is arranged to delay data from the input optical link for one switching period.

Preferably the output optical switch and the delay switch are either a monostable or a bistable device.

Preferably the communications node is arranged such that the input optic link and the output optic link carry a plurality of channels in the form of a Wavelength Division Multiplexed (WDM) optical signal.

Preferably at least one of the input optic link and the output optic link is an optic fibre.

According to a fourth aspect of the technology disclosed herein there is provided a communications network including a node according to the first, second or third aspect of the technology disclosed herein.

Preferably the communications network further includes a plurality of nodes arranged in a ring network.

According to a fifth aspect of the technology disclosed herein there is provided a method of routing an optical signal comprising at least one data packet from a first data flow using a communications node having an input optic link and an output optic link in communication with each other, the method including splitting an incoming optical signal input to the input optic link into at least two substantially identical optical signals using an optical splitter, passing one of the optical signals to an optical correlator and the other of the optical signals to an input optical switch, using the optical correlator to compare an address of the packet with a reference address, generating a trigger if the reference address matches the address of the packet, and switching the data packet to an optical to electrical converter using the input optical switch in response to the trigger to drop the data packet from the node.

The method may further including delaying the optical signal between the optical splitter and the input switch using an input delay line.

Preferably the method further includes dropping the data packet from the node using a data processing unit in communication with the optical to electrical converter.

Preferably the method further includes only processing data packets that are addressed to the data processing unit.

The method may further include adding a data packet to the node using a transmitter in communication with an output optical switch which has an input from the input optical switch, the output optical switch having an output to the output optic link.

Preferably the method further includes transmitting an optical packet to the output optical switch from the transmitter in response to the trigger from the optical correlator.

The method may further include switching an optical packet from the transmitter to the output optic link using the output optical switch in response to the trigger from the optical correlator.

The method may further include switching an optical packet to the output optic link pursuant to the input optical switch switching a data packet to the optical to electrical converter.

The method may further include adding a dummy packet to the node and filling a payload of the dummy packet with a payload of a data packet added to the node.

In one embodiment the method further includes requesting a dummy packet to be added to the node using the transmitter.

In one embodiment the method further includes adding a dummy packet to the node at a predetermined rate. In another embodiment the method further includes monitoring the amount of data dropped from the node and the amount of data added to the node, and adding a dummy packet to the node if the difference between the amount of data dropped from the node and the amount of data added to the node falls below a threshold. In yet another embodiment the method further includes monitoring the amount of data dropped from the node and the amount of data added to the node, and adding a dummy packet to the node if the amount of data dropped from the node falls below a threshold.

Preferably the method further includes generating the trigger in response to a dummy packet detected by the correlator.

The method may further include delaying data from the input optical switch using a delay switch having an input from the input optical switch, the delay switch having an output to the output switch and another output to an output delay line, the output delay line in communication with an input to the output switch, and switching data from the input switch to the output delay line or to the output switch using the delay switch under control of the transmitter.

Preferably the method further includes sending data from the transmitter to the output switch in response to sending data from the input switch to the output delay line.

The method may further include delaying data from the input optical switch for one switching period using the delay switch.

According to a sixth aspect of the technology disclosed herein there is provided a method for routing an optical signal comprising at least one data packet from a first data flow using a communications the node having an input optic link and an output optic link in communication with each other, the method including splitting an incoming optical signal input to the input optic link into at least two substantially identical optical signals using an optical splitter, passing one of the optical signals to an optical correlator and the other of the optical signals to an output optical switch, using the optical correlator to compare an address of the packet with a reference address, generating a trigger if the reference address matches the address of the packet, and switching another data packet to the output optical link in response to the trigger using the output optical switch (38) to add data to the node.

Preferably the method further includes delaying the optical signal between the optical splitter and the output switch using an input delay line.

Preferably the method further includes adding the data packet to the node using a transmitter in communication with the output optical switch.

The method may further include adding data to a buffer prior to being input to the transmitter.

Preferably the method further includes transmitting an optical packet to the output optical switch in response to the trigger from the optical correlator.

Preferably the method further includes dropping a data packet from the node using an input optical switch between the optical splitter and the output optical switch when the output optical switch switches a data packet to the output optical link.

In one embodiment the method further includes adding a dummy packet to the node and filling the dummy packet with a data packet added to the node.

Preferably the method includes requesting a dummy packet to be added to the node using the transmitter.

In one embodiment the method further includes adding a dummy packet to the node at a predetermined rate. In another embodiment the method further including monitoring the amount of data dropped from the node and the amount of data added to the node using a data monitoring device, and adding a dummy packet to the node if the difference between the amount of data dropped from the node and the amount of data added to the node falls below a threshold. In yet another embodiment the method further including monitoring the amount of data dropped from the node and the amount of data added to the node using a data monitoring device, and adding a dummy packet to the node if the amount of data dropped from the node falls below a threshold.

Preferably the method further includes generating the trigger in response to a dummy packet detected by the correlator.

In one embodiment the method further includes delaying data from the optical splitter using a delay switch having an input from the optical splitter, the delay switch having an output to the output switch and another output to an output delay line, the output delay line in communication with an input to the output switch, and switching data from the optical splitter to the output delay line or to the output switch using the delay switch under control of the transmitter.

Preferably the method further includes sending data from the transmitter to the output switch in response to sending data from the optical splitter to the output delay line.

Preferably the method further includes delaying data from the optical splitter for one switching period using the delay switch.

According to a seventh aspect of the technology disclosed herein there is provided a method for routing an optical signal comprising at least one data packet from a first data flow using a communications node having an input optic link and an output optic link in communication with each other, the method including inputting data from the input optic link to a delay switch having an output to an output optical switch and another output to an output delay line, the output delay line in communication with an input to the output optical switch, passing data input to the delay switch to the output delay line or to the output switch under control of the transmitter, and transmitting data to the output switch using the transmitter in response to the delay switch sending data to the output delay line to add data to the node.

Preferably the method further includes adding data to a buffer prior to sending it to the transmitter.

Preferably the method further includes delaying data from the input optical link for one switching period using the delay switch.

According to an eighth aspect of the technology disclosed herein there is provided software, or a computer program product, which when run on a computer processor of a communications node causes data to be dropped from the node, the node for routing an optical signal comprising at least one data packet from a first data flow, the node having an input optic link and an output optic link in communication with each other, the software for causing an incoming optical signal input to the input optic link to be split into at least two substantially identical optical signals using an optical splitter, passing one of the optical signals to an optical correlator and the other of the optical signals to an input optical switch, the optical correlator for comparing an address of the packet with a reference address, generating a trigger if the reference address matches the address of the packet, and switching the data packet to an optical to electrical converter using the input optical switch in response to the trigger to drop the data packet from the node.

According to a ninth aspect of the technology disclosed herein there is provided software, or a computer program product, which when run on a computer processor of a communications node causes data to be added to the node, the node for routing an optical signal comprising at least one data packet from a first data flow, the node having an input optic link and an output optic link in communication with each other, the software for causing an incoming optical signal input to the input optic link to be split into at least two substantially identical optical signals using an optical splitter, passing one of the optical signals to an optical correlator and the other of the optical signals to an output optical switch, the optical correlator for comparing an address of the packet with a reference address, generating a trigger if the reference address matches the address of the packet, and switching another data packet to the output optical link using the output optical switch in response to the trigger to add data to the node.

According to a tenth aspect of the technology disclosed herein there is provided software, or a computer program product, which when run on a computer processor of a communications node causes data to be added to the node, the node for routing an optical signal comprising at least one data packet from a first data flow, the communications node having an input optic link and an output optic link in communication with each other, the software for causing data from the input optic link to be input to a delay switch having an output to an output optical switch and another output to an output delay line, the output delay line in communication with an input to the output optical switch, passing data input to the delay switch to the output delay line or to the output switch under control of the transmitter, and transmitting data to the output switch using the transmitter in response to the delay switch sending data to the output delay line to add data to the node.

Other features of the invention will be apparent from the following description of preferred embodiments shown by way of example only in the accompanying drawings, in which.

DETAILED DESCRIPTION

Figure 1:
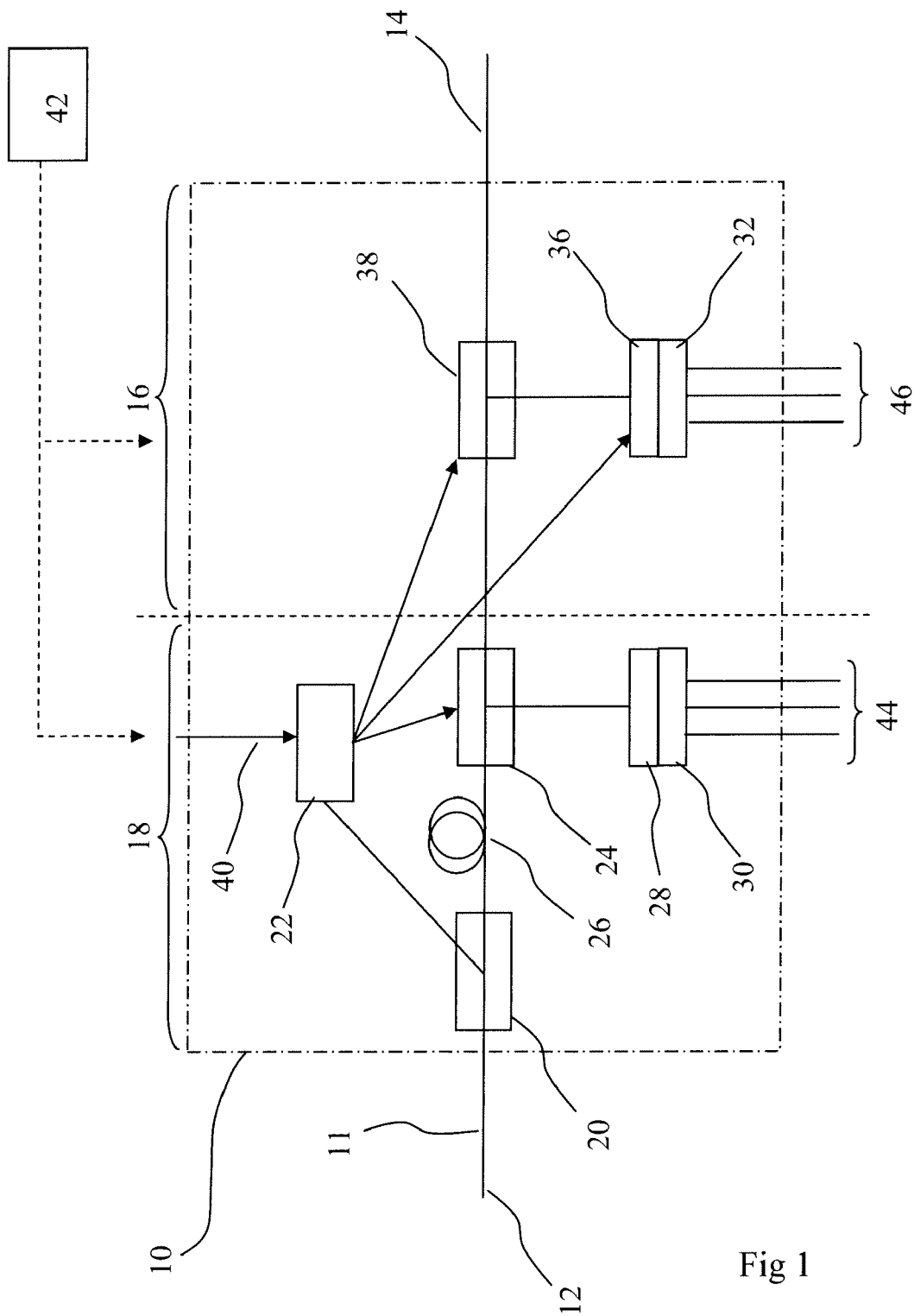
FIG. 1 is a schematic diagram of the architecture for a node according to a first embodiment of the technology disclosed herein.

FIG. 1 shows a schematic diagram of the architecture for a node according to a first embodiment of the technology disclosed herein, generally designated 10. In FIG. 1 the arrows represent control functions of the node 10 whereas lines without arrows represent data lines containing data flows travelling either in the optical domain or the electrical domain. The node 10 is shown with an optic link 11 having one input optic fibre 12 and one output optic fibre 14. The input fibre 12 is for receiving traffic from, for example, an adjacent node. The output fibre is for sending traffic to, for example, an adjacent node. For simplicity only one optical fibre containing data travelling West to East as seen in FIG. 1 will be described in detail but it will be appreciated that in real-life the node 10 would also have an optic fibre containing data travelling from East to West, and the skilled person will know the requirements to achieve this using the principles of the embodiments of the technology disclosed herein. Typically the node 10 would be arranged in a ring of similar nodes linked with fibres in a clockwise and anticlockwise direction using known arrangements.

The operation of the node 10 is described below for one wavelength or channel for the purposes of clarity, but it will be appreciated that it can be scaled for multiple wavelengths, as required, such that the input optic fibre 12 and the output optic fibre 14 are arranged to carry a plurality of channels in the form of a Wavelength Division Multiplexed (WDM) optical signal such as a Coarse WDM (CWDM) or Dense WDM (DWDM) optical signal.

Figure 5:
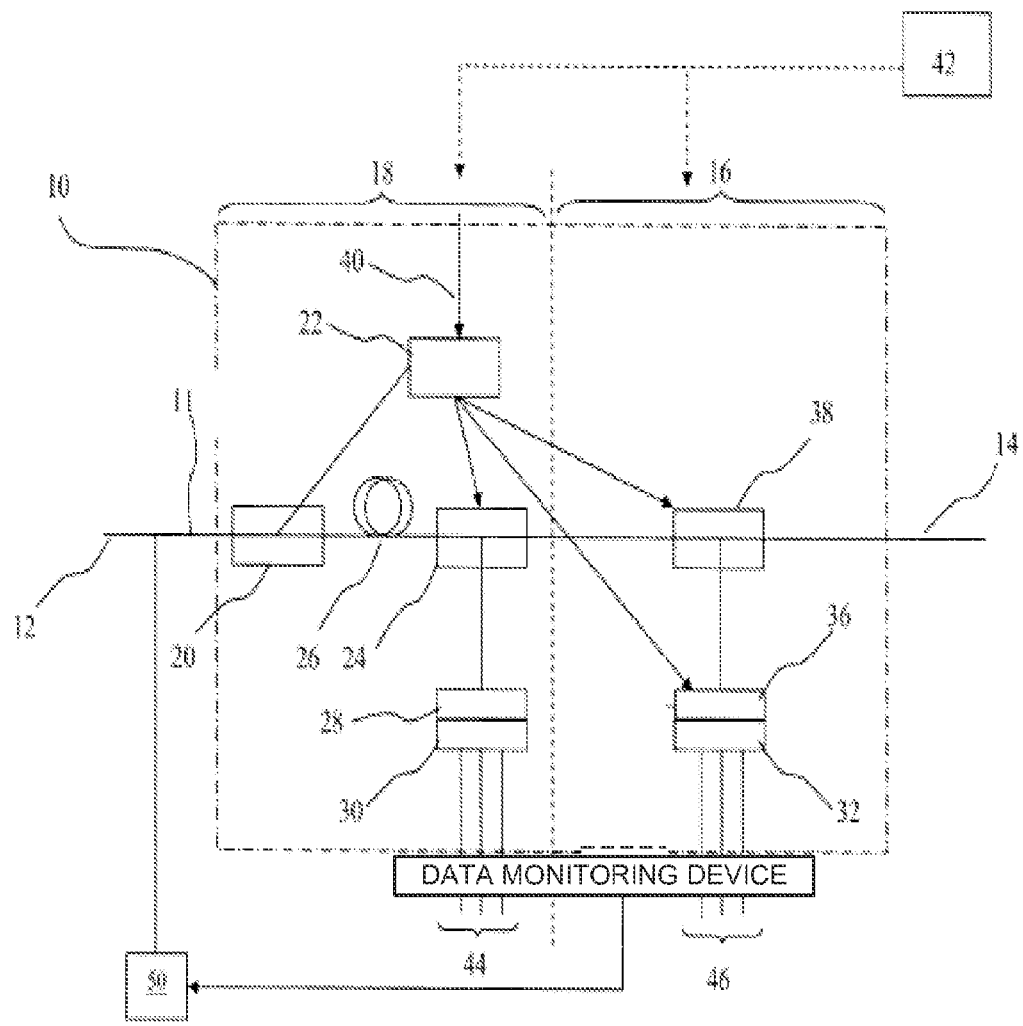
FIG. 5 is a schematic diagram of the architecture for a node accoding to an example embodiment which includes a data monitoring device.

The node 10 comprises a multiplexer part 16 and a demultiplexer part 18. The demultiplexer part 16 includes an optical splitter 20, an optical correlator 22, an input optical switch 24, an input delay line 26, an optical-electrical converter 28 and a processing unit 30. The multiplexer part 16 includes a buffer 32, a transmitter 36 and an output optical switch 38. A suitable splitter 20 for the purposes of the technology disclosed herein is an arrangement of two optical fibres in close contact to optically split an incoming signal on the input fibre 12 into two similar signals. The skilled person will know the requirements for such a splitter 20. The operation and interaction of the correlator 22 and the input switch 24 are described in detail with reference to FIG. 5.

A suitable optical correlator 22 for the purposes of the technology disclosed herein can be found in "Characterisation of a Full Encoder/Decoder in the AWG Configuration for Code-Based Photonic Routers", Naoya Wada et al, Journal of Lightwave Technology, Vol 24, No 1, p 113, January 2006. A suitable fast optical switch 24, 38 for the purposes of the technology disclosed herein can be found in "A Novel Fast Optical Switch based on two Cascade Terahertz Optical Asymmetric Demultiplexers", C Bing et al, Optical Express, Vol. 10, No 1, p 15, 14.sup.th January 2002.

Referring to FIG. 1, in use, a single wavelength is input to the node 10 at the input optic fibre 12. This single wavelength corresponds to a data channel which comprises an optical data stream of packets of data. The optical data stream may contain packets of data from more than one data flow. These packets comprise a payload and a header according to a known arrangement which are coded as a bit pattern by differences in light intensity. According to the technology disclosed herein the input optic fibre 12 containing the single wavelength is in communication with the optical splitter 20 shown in FIG. 1. The optical splitter 20 splits the incoming optical signal into two substantially identical signals. One of these signals is input to the optical correlator 22, the other signal is input to an input delay line 26 which then passes to the input switch 24. The optical correlator 22 compares packet headers with a reference address which is input at 40 to the optical correlator 22. The reference address is input to the optical correlator 22 under the management of a control channel provided by a control unit 42 which is external to the node 10. The optical switch 24 is controlled by the optical correlator 22 indicated in FIG. 1 by the arrow between the correlator 22 and the optical switch 24.

In operation the optical correlator 22 compares a header of an incoming packet with the reference address. If a matching bit pattern is found the optical correlator 22 triggers the optical switch 24 which directs the payload of the incoming packet received from the splitter 20 and input delay line 26 to the optical-electrical converter 28. The optical-electrical converter 28 comprises a photo detector which is chosen to be fast enough to accept the bit-rate of the incoming packets to change the optical signal into an electrical signal. The skilled person will know the requirements for such an optical-electrical converter. The electrical signal is then passed to the data processing unit 30 where the data can be dropped from the node 10 at 44.

The optical switch 24 has two states and can be either a monostable or a bistable device. In the case of a monostable device only one of the states of the optical switch 24 is stable, but the other is not stable, such that the optical switch 24 can be flipped into the unstable state in response to an external event or trigger. The monostable device will eventually return to the stable state. In the case of a bistable device, the optical switch 24 will remain in either state indefinitely until acted on by an external event or trigger. In both cases such a trigger may be provided as an optical signal or an electrical signal from the optical correlator 22.

The configuration of the optical switch 24 is such that the data processing unit 30 is arranged to process only the data packets that are addressed to it. Data packets that are not addressed to the node 10, i.e. the optical address does not match the reference address, will not be sent to it by the optical switch 24. It will be appreciated that this arrangement has the advantage that the data processing unit 30 is only required to handle a much lower bit rate than the optical transport network itself, such as that found in the optical link 11. Such an arrangement permits the data processing unit 30 to be implemented electronically which further has the advantage that the individual data flows can be processed in a more complex manner as necessary.

Data can be added to the node 10 at the uplink 46. Such data is first input to the buffer 32 where it is temporarily stored until it is processed. The data is sent to the output optical switch 38 by the transmitter 36 under the control of the optical correlator 22 which is indicated by the arrow from the optical correlator 22 to the transmitter 36. Optical multiplexing is performed at the output optical switch 38 which is controlled by the optical correlator 22 and indicated by the arrow from the optical correlator 22 to the output optical switch 38. It will be appreciated that the data input to the input optic fibre 12 which is not dropped from the node 10 continues to the output optic fibre 14.

In the node 10 the rate of adding data at 46 is limited by the rate of dropping data at 44. This is because the output optical switch 38 can only add data to the optical link 11 corresponding to the input optical switch 24 dropping traffic from the node 10 which avoids collision of optical data packets in the optical link 11. In effect the downlink 44 creates space in the data streaming through the optical link 11 which can be filled by the uplink 46. Such a way of operating the node 10 is very effective because traffic added to the node 10 does not occupy additional space in the sequence of data in the optical link 11, but merely fills available space in the optical link 11 which has been created by the traffic dropped from the node 10. In effect the uplink 46 uses time slots in the data traffic created by the downlink 44.

In most practical situation the time slots created by dropping data from the node 10 at 44 provides sufficient capacity for the data added to the node 10 because usually the amount of uplink traffic is less that the amount of downlink traffic. Furthermore the buffer 32 provides a way of ensuring that the uplink traffic can be added to the node 10 in an optimal, or at least an efficient, manner so that the data is temporarily stored if there are temporarily no available time slots. However, when a higher uplink data rate is required it is possible to make time slots available in the optic link 11 by adding dummy packets in the manner described below with reference to FIG. 2.

Figure 2:
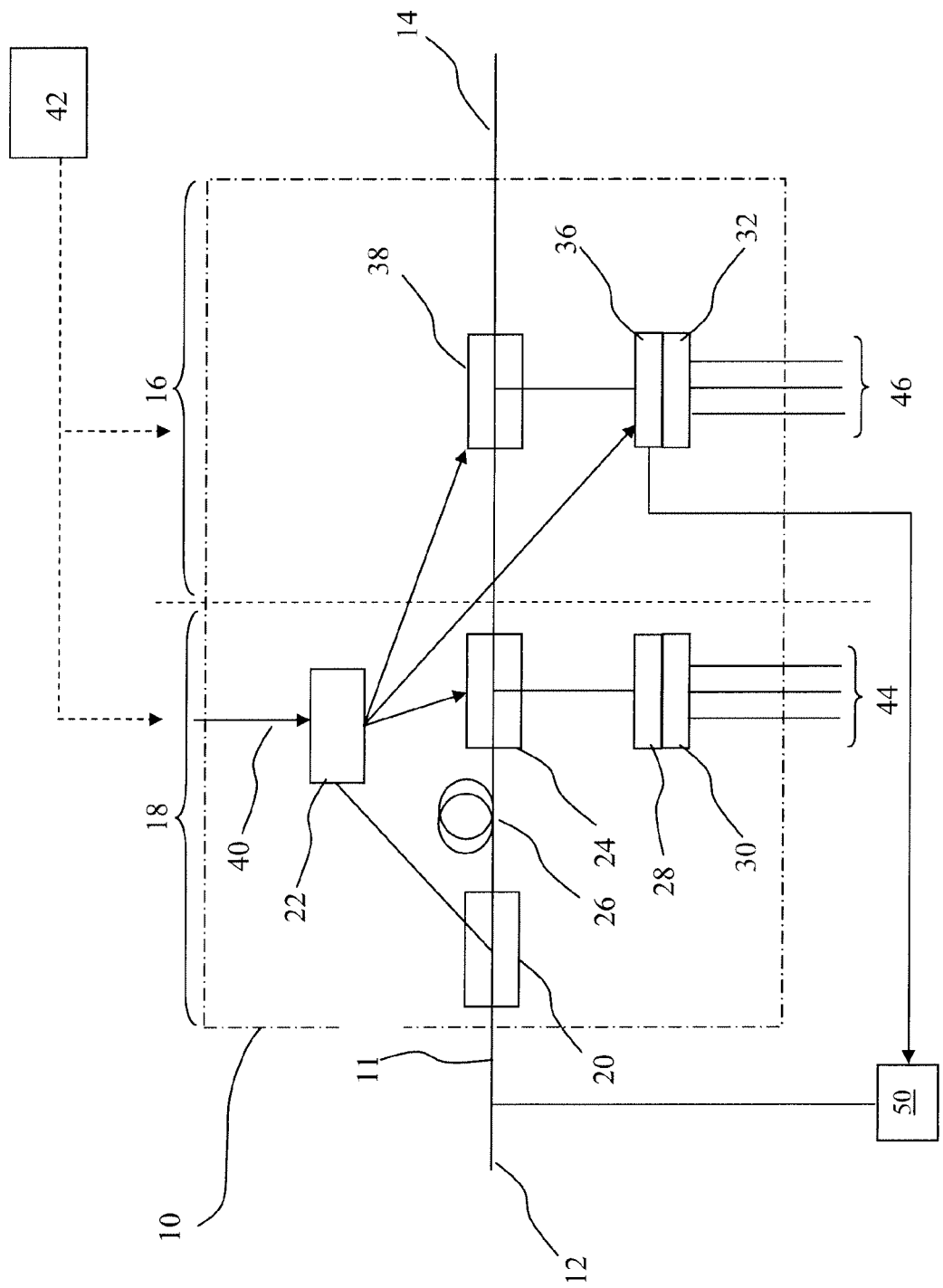
FIG. 2 shows the node of FIG. 1 modified for the addition of dummy packets.

FIG. 2 shows the node of FIG. 1 modified for the addition of dummy packets. Like features to the embodiment of FIG. 1 are shown with like reference numerals. In FIG. 2 dummy packets are added to the node 10 using a control node 50 in communication with the input optic fibre 12. Essentially a dummy packet comprises a header identifying the packet as a dummy packet and a payload which is empty. The dummy packets are addressed to the node 10 but are not addressed to the data processing unit 30. The dummy packets are not sent to the optical-electrical converter 28 by the optical switch 24 so that they pass directly to the output optical switch 38. Accordingly the data processing unit 30 does not react to the dummy packets. In this way the control node 50 injects dummy packets into the data stream which creates space in the data stream that can be filled by data added to the node 10 at the uplink 46. According to the technology disclosed herein there are three different methods for injecting dummy packets. The first method involves the transmitter 36 requesting dummy packets from the control node 50 as shown by the arrow between the transmitter 36 and the control node 50 in FIG. 2. The second method involves the control node 50 automatically injecting dummy packets periodically at a predetermined rate, and without the need for the node 10 to request dummy packets from the control node 50. The third method involves monitoring the amount of data dropped from the node at 44 and the data added to the node at 46, and inserting dummy packets in the manner described with reference to FIG. 3.

Figure 3:
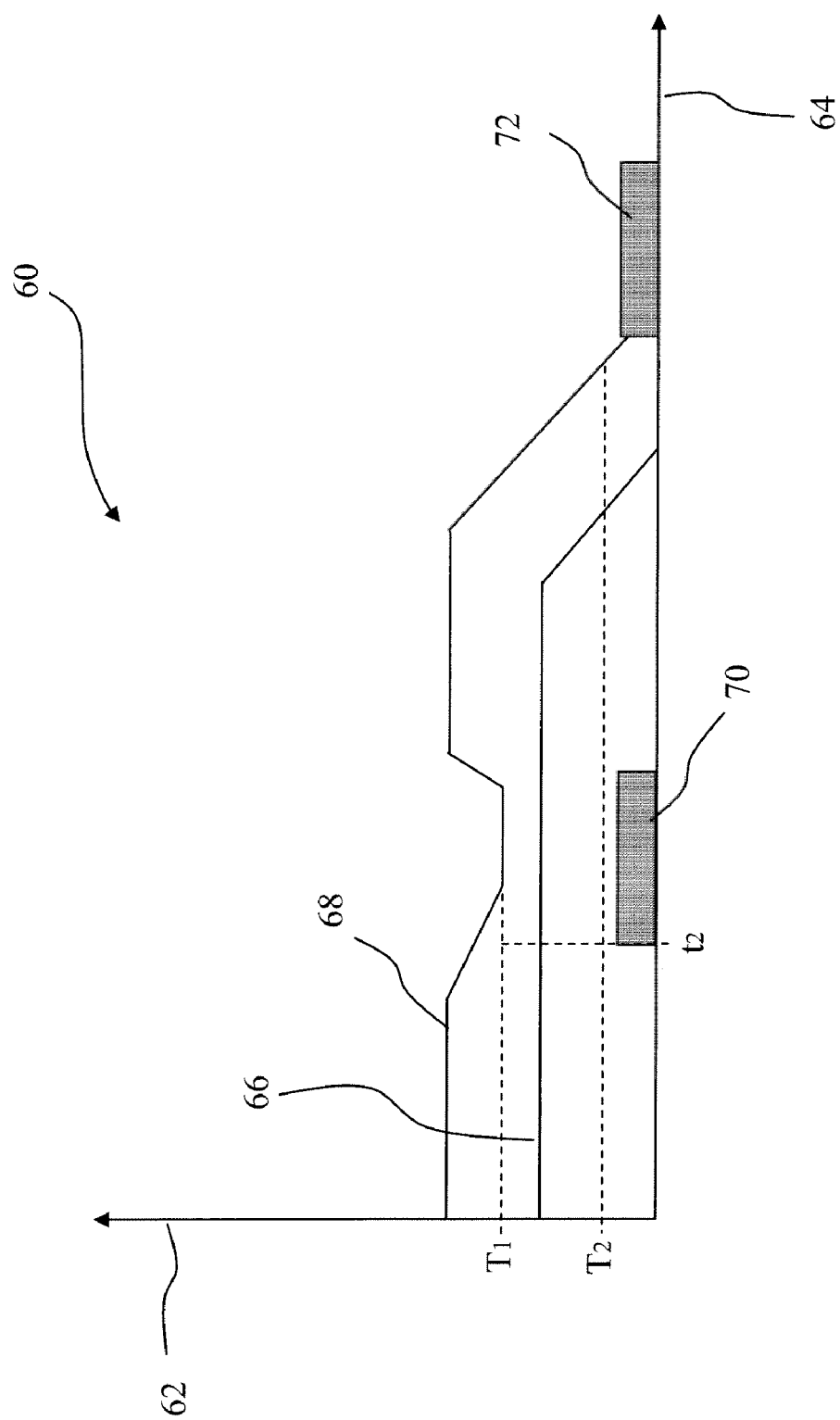
FIG. 3 shows a graph illustrating the traffic added to and dropped from the node of FIG. 1 over time.

FIG. 3 shows a graph, generally designated 60, illustrating the traffic added to and dropped from the node 10 over a period of time. The graph 60 has a y-axis 62 showing the traffic load and an x-axis 64 showing time. The uplink traffic is shown at 66 and the downlink traffic is shown at 68. FIG. 3 shows that when the difference between the amount of downlink traffic 68 and uplink traffic 66 decreases below a certain threshold $T_1$ dummy packets 70 are inserted into the data stream by the control node 50. FIG. 3 also shows that where there is a fall in the amount of downlink traffic 68 below a threshold $T_2$ dummy packets 72 are also inserted into the data stream by the control node 50.

It will be appreciate that $T_1$ is not an absolute threshold value like $T_2$. $T_1$ is a floating threshold value that may occur when the rate of downlink traffic 68 and uplink traffic 66 is relatively high or relatively low. For this reason it is more appropriate to refer to when the difference between the amount of downlink traffic 68 and uplink traffic 66 decreases below a certain threshold level, for example at time $t_1$ as shown in FIG. 3.

Referring back to FIG. 2, when a dummy packet is detected by the correlator 22 a trigger is sent to the transmitter 36 indicated by the arrow between the correlator 22 and the transmitter 36. This trigger indicates when the transmitter 36 should send traffic to the output optical switch 38 so that it coincides with the space created by the dummy packets.

Figure 4:
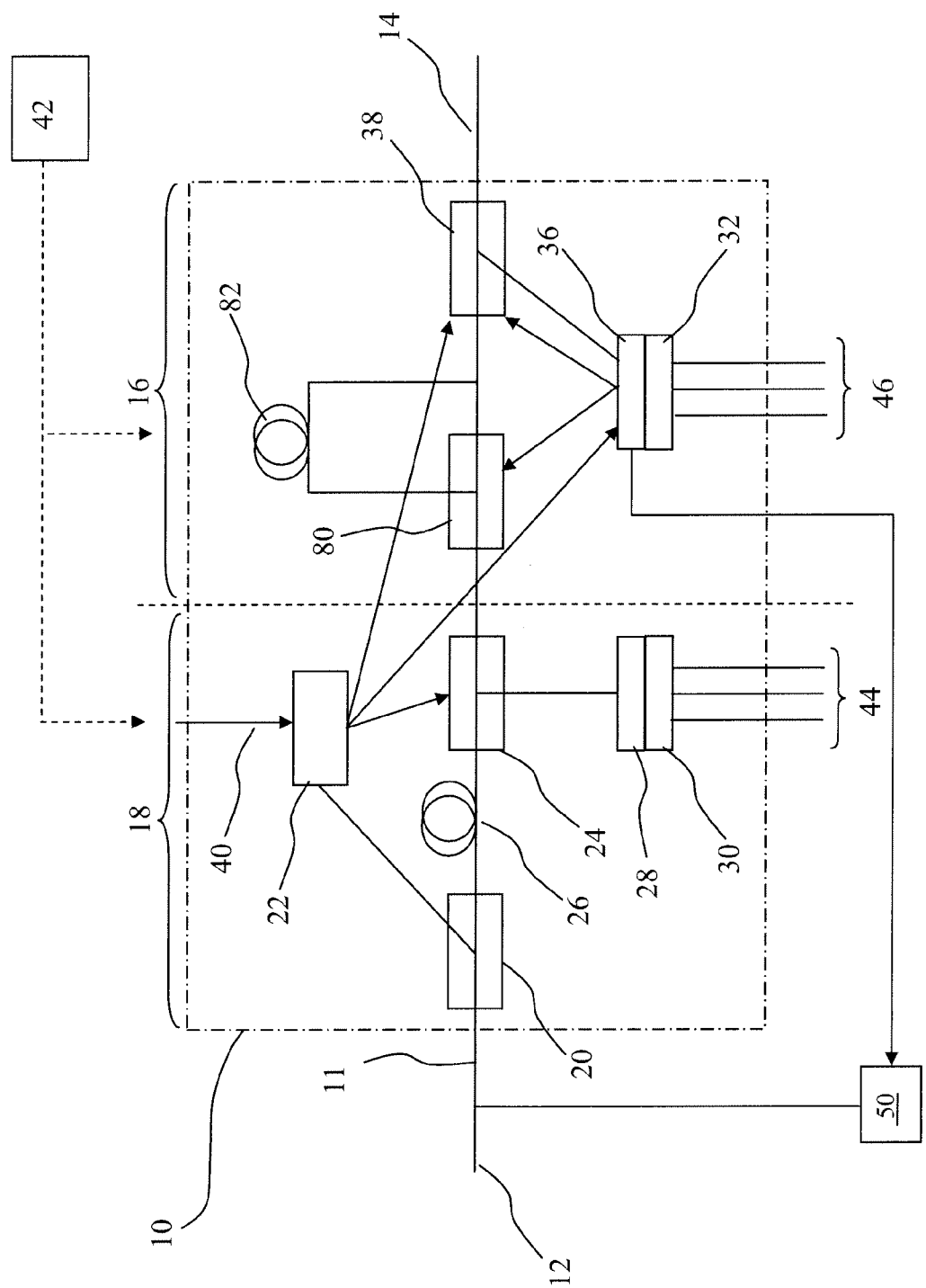
FIG. 4 shows the node of FIG. 1 modified for the addition of dummy packets according to an alternative embodiment.

FIG. 4 shows the node of FIG. 1 modified for the addition of dummy packets according to another embodiment. Like features to the embodiment of FIG. 1 are shown with like reference numerals. In FIG. 4 the transmitter 36 is shown in control of a delay switch 80 and the output switch 38 by the arrows shown between the transmitter 36 and the delay switch 80, and the transmitter 36 and the output switch 38 respectively. The delay switch 80 accepts traffic from the input switch 24 and can send it to an output delay line 82 or to the output switch 38. The output delay line 82 is also in communication with the output switch 38. The embodiment of FIG. 4 is intended for use in real-time application such as video or voice communications that require the delivery of uplink traffic with a minimum delay.

In use the node of FIG. 4 recognises that the uplink traffic is required to be sent with a minimum delay. This may be performed, for example, by the transmitter 36 recognising an indicator in the packet header. The transmitter 36 does not wait for time slots to become available in the optic link 11 due to dropped traffic, but instead notifies the delay switch 80 to delay traffic in the optic fibre link 11 by sending it to the output delay line 82. This creates available time slots on the optic fibre link 11 which can be used for the uplink traffic. In turn this ensures that the uplink traffic can be sent with minimum delay. Typically the transmitter 36 delays the traffic in the optic link 11 for one switching period but it will be appreciated that longer time periods can be used as appropriate. Traffic sent to the output delay line 82 is then reinserted into the optic fibre link 11 by inserting it into the output optical switch 38. In this way the node of FIG. 4 can be used to send traffic with the minimum delay.

The node 10 according to embodiments of the technology disclosed herein can be used in a high-capacity optical transport network and may be used to support optical switching at the THz bitrate. The node 10 has the advantage that several data, flows can be transported by one wavelength (i.e. one channel). A higher data transmission is possible using the node 10 because not all of the data is required to be converted from the optical to the electrical domain. It is therefore possible for a much higher data rate to be achieved using the node 10 rather than by conversion of all optical data into electrical data where the transmission rate is limited by the detector and the processing speed of the electronics. Furthermore because the data processing unit 30 can be realised using electronic processors rather than optical devices the node 10 is cheaper to implement.

The skilled person will realise that to drop a second data flow from the node 10 that is transmitted in the optical link 11 it is possible to duplicate the optical-electrical converter 28 and the data processing unit 30. The second data flow can then be sent to the duplicated optical-electrical converter 28 and the data processing unit 30 and dropped from the node as required. Alternatively the reference address 60 can be changed to refer to a second data flow so that packets from the second data flow are addresses to the optical-electrical converter 28 and the data processing unit 30. This alternative arrangement avoids the need to duplicate the optical-electrical converter 28 and the processing unit.

The above embodiments have been described for use with data streams comprising optical headers which are coded by differences in light intensity. It will be appreciated that the same principles underlying the technology disclosed herein could be applied to other ways of coding optical headers depending on the type of optical correlator used.

The invention claimed is:

1. A communications node for routing an optical signal comprising at least one data packet from a first data flow, the node comprising:
    an input optic link and an output optic link in communication with each other;
    an optical correlator;
    an optical input switch;
    an optical to electrical converter;
    a transmitter;
    an optical splitter, the input optic link being in communication with the optical splitter, the optical splitter being arranged to split an incoming optical signal into at least two substantially identical optical signals, the optical splitter further arranged to pass one of the optical signals to the optical correlator and the other of the optical signals to the input optical switch;
    the optical correlator being arranged to compare an address of the packet with a reference address and to generate a trigger signal if the reference address matches the address of the packet;
    the input optical switch being arranged to route the data packet to the optical to electrical converter in response to the trigger signal to drop the data packet from the node;
    an input delay line between the optical splitter and the input switch;
    an output optical switch receiving an input from the transmitter and the input optical switch, the output optical switch having an output to the output optic link;
    the transmitter being adjusted to add a data packet to the node;
    the transmitter being arranged to transmit an optical packet to the output optical switch in response to the trigger signal from the optical correlator; and
    a control node in communication with the input optic link and arranged to add a dummy packet, and wherein upon detecting the dummy packet the optical correlator is arranged to cause the transmitter to fill a payload of the dummy packet with the payload of a data packet added to the node.

2. A communications node according to claim 1, wherein the dummy packet is addressed to the node but not addressed to the optical to electrical converter.

3. A communications node according to claim 1, wherein the dummy packet is added to the node at a predetermined rate.

4. A communications node according to claim 1, further comprising a data monitoring device, and wherein an amount of data dropped from the node and an amount of data added to the node are adapted to be monitored by the data monitoring device, and the dummy packet is arranged to be added to the node if the difference between the amount of data dropped from the node and the amount of data added to the node falls below a first threshold, or if the amount of data dropped from the node falls below a second threshold.

5. A communications node according to claim 1, further including routing at least one data packet from a second data flow in the input optical link.

6. A method of routing an optical signal comprising at least one data packet from a first data flow using a communications node comprising an input optic link and an output optic link in communication with each other, the method comprising:
    splitting an incoming optical signal input to the input optic link into at least two substantially identical optical signals using an optical splitter;
    passing one of the optical signals to an optical correlator and the other of the optical signals to an input optical switch;
    using the optical correlator to compare an address of the packet with a reference address;
    generating a trigger signal if the reference address matches the address of the packet;
    switching the data packet to an optical to electrical converter using the input optical switch in response to the trigger to drop the data packet from the node;
    delaying the optical signal between the optical splitter and the input switch using an input delay line;
    adding a data packet to the node using a transmitter in communication with an output optical switch which has an input from the input optical switch, the output optical switch having an output to the output optic link;
    transmitting an optical packet to the output optical switch from the transmitter in response to the trigger from the optical correlator;
    adding a dummy packet on the input optic link; and
    the optical correlator detecting the dummy packet and in response thereto the transmitter filling a payload of the dummy packet with the payload of a data packet added to the node.

7. A method according to claim 6, further including adding the dummy packet to the node at a predetermined rate.

8. A method according to claim 6, further including monitoring the amount of data dropped from the node and the amount of data added to the node, and adding the dummy packet to the node if the difference between the amount of data dropped from the node and the amount of data added to the node falls below a first threshold, or if the amount of data dropped from the node falls below a second threshold.

9. A method according to claim 6, further including generating the trigger signal in response to the dummy packet being detected by the correlator.

10. A communications node according to claim 1, wherein the control node is arranged to add the dummy packet into a data stream to the optical splitter in response to a request from the transmitter.

11. A method according to claim 6, further comprising using a controller to add the dummy packet into a data stream to the optical splitter in response to a request from the transmitter.

12. A communications node according to claim 1, wherein the optical correlator is arranged to send the trigger signal to the transmitter in response to detecting the dummy packet and the transmitter is arranged to fill the payload of the dummy packet with the payload of the data packet added to the node.

13. The method according to claim 6, further comprising:

upon detecting the dummy packet, the optical correlator sending the trigger signal to the transmitter;

in response to the trigger signal the transmitter filling the payload of the dummy packet with the payload of the data packet added to the node.

\* \* \* \* \*